US008793005B2

(12) United States Patent
Tissier et al.

(10) Patent No.: US 8,793,005 B2
(45) Date of Patent: Jul. 29, 2014

(54) EMBEDDING AUDIO DEVICE SETTINGS WITHIN AUDIO FILES

(75) Inventors: Douglas Tissier, San Jose, CA (US); Robert Dunn, Buena Vista, CO (US); Hiro Shimozato, San Francisco, CA (US)

(73) Assignee: Avid Technology, Inc., Burlington, MA (US)

( * ) Notice: Subject to any disclaimer, the term of this patent is extended or adjusted under 35 U.S.C. 154(b) by 634 days.

(21) Appl. No.: 12/879,615

(22) Filed: Sep. 10, 2010

(65) Prior Publication Data

US 2012/0065750 A1 Mar. 15, 2012

(51) Int. Cl.
*G06F 17/00* (2006.01)
*G10H 1/00* (2006.01)

(52) U.S. Cl.
CPC ....... *G10H 1/0091* (2013.01); *G10H 2240/071* (2013.01)
USPC ........................................................ 700/94

(58) Field of Classification Search
USPC ........................................ 700/94; 381/119
See application file for complete search history.

(56) References Cited

U.S. PATENT DOCUMENTS 6,345,279 B1 * 2/2002 Li et al. ................................ 1/1
6,704,421 B1 * 3/2004 Kitamura ...................... 381/103
8,035,020 B2 * 10/2011 Taub et al. ...................... 84/600
2005/0240395 A1 * 10/2005 Wiser et al. .................. 704/201
2006/0206221 A1 * 9/2006 Metcalf ........................... 700/94
2010/0286806 A1 * 11/2010 Booth et al. .................... 700/94

OTHER PUBLICATIONS

European Broadcast Union, Wave Format, "BWF—a format for audio data files in broadcasting", Version 1, Jul. 2001, Technical Spec. 3285, 15 pgs.

Zoom Corporation, H2 Handy Recorder, Product Brochure, Aug. 1, 2007, pp. 1-7.

* cited by examiner

*Primary Examiner* — Andrew C Flanders
(74) *Attorney, Agent, or Firm* — Oliver Strimpel

(57) ABSTRACT

Methods of representing, recreating, and editing an audio composition involving: receiving at a digital audio workstation audio data that has been processed by an audio processing device; receiving at the digital audio workstation a set of metadata specifying a value for each of a plurality of settings of the audio processing device that define the state of the corresponding setting of the audio processing device when raw audio data received by the audio processing device was processed to generate the processed audio data; and storing the received processed audio data and the received set of metadata in an audio file, wherein the processed audio data is designated as audio information and the metadata is designated as settings data. The settings may be stored in a WAV or AIFF audio file, and may be retrieved, parsed, and applied to restore the audio processing device to the state corresponding to the retrieved audio.

15 Claims, 3 Drawing Sheets

EMBEDDING AUDIO DEVICE SETTINGS WITHIN AUDIO FILES

BACKGROUND

When recording audio a composer often achieves a desired sound or effect by using a special purpose device, such as an effects processor that acts upon the raw sound from an instrument. Such audio processing makes use of increasingly sophisticated devices so as to provide the composer with ever greater scope to alter and manipulate the raw sound. Along with this increased functionality, comes a greater number of controls and settings that contribute to shaping the recorded sound. In current workflows, when the processed data is recorded, it is up to the composer to make a record of the settings that were used to create the sound. This is typically done by taking manual notes, or, for effects created entirely by an effects processing device, by saving the settings as a preset within the device. Unless such specific action is taken, the various settings and controls that were used to achieve the end result may be lost, and to recreate the sound, the composer needs to start again from scratch. This can be especially difficult when the composer wishes to recreate a sound for overdubbing and an exact sound match is needed. In such circumstances, it is often easier for the composer simply to attempt to recreate the sound, and then rerecord an entire part or piece. In addition, sharing a sound type is not supported with present systems. Though processed audio is readily shared, it is difficult for a composer to share the precise settings and controls that were used on the audio processing device to recreate the processed audio.

SUMMARY

In general, the invention features inserting audio processing effects metadata within an audio file. For example, settings of devices used to create a sound are stored within the audio file that contains the sound created using those settings. A new portion of an audio file is inserted into the file for the specific purpose of storing the device settings. Audio recording workflows are enabled, in which effects processing data corresponding to audio data in a file are retrieved, shared, and edited.

In general, in one aspect, a method of representing an audio composition includes receiving at a digital audio workstation processed audio data that has been processed by an audio processing device; receiving at the digital audio workstation a set of metadata specifying a value for each of a plurality of settings of the audio processing device, wherein the value defines the state of the corresponding setting of the audio processing device when raw audio data received by the audio processing device was processed to generate the processed audio data; and storing the received processed audio data and the received set of metadata in an audio file, wherein the processed audio data is designated as audio information and the metadata is designated as settings data.

Various embodiments include one or more of the following features. The audio processing device processes raw audio to produce audio effects. The plurality of settings include a distortion effect setting and/or a reverb effect setting. The audio file is stored in a waveform audio file format or an AIFF format, the audio data is stored in one or more audio data chunks and the metadata is stored in a settings chunk. The raw audio data is received by the audio processing device from a musical instrument, which may be an electric guitar, a synthesizer, or a sampler. The digital audio workstation or the audio processing device is used to select the audio file, extract the set of metadata from the audio file, transfer the metadata from the digital audio workstation to the audio processing device, and the audio processing device is used to parse the metadata to extract the values for each of the plurality of settings, and the plurality of settings of the audio processing device are adjusted to correspond to the extracted values.

In general, in another aspect, recreating a state of an audio processing device corresponding to a recorded sound of an instrument processed by the audio processing device, the method includes: selecting an audio file that includes a recording of the processed instrument sound, wherein the audio file includes processed audio data that has been processed by the audio processing device and metadata specifying a value for each of a plurality of settings of the audio processing device, wherein the value defines the state of the corresponding setting of the audio processing device when audio data from the instrument was received by the audio processing device and was processed to generate the processed audio data; transferring the metadata to the audio processing device; using the audio processing device to parse the metadata to extract the values for each of the plurality of settings; and adjusting the plurality of settings of the audio processing device to correspond to the extracted values.

Various embodiments include one or more of the following features. Receiving at the audio processing device, audio data from the instrument, and processing the audio data using the audio processing device to output processed audio having the recorded sound of the instrument. The processed audio data includes audio effects introduced by the audio processing device. The audio effects include at least one of a distortion effect, a reverb effect, and a delay effect. The instrument is a guitar, a synthesizer, or a sampler. Receiving at the audio processing device unprocessed audio data output by the instrument, processing the received audio data, outputting the processed audio data for monitoring by a user; and enabling the user to further adjust at least one of the plurality of settings of the audio processing device. Enabling the user to further adjust at least one of the plurality of settings of the audio processing device to alter an audio effect already present in the recorded sound, or to introduce an audio effect that was not already present in the recorded sound.

In general, under yet another aspect, a method of storing processed audio data implemented on an audio workstation includes: receiving processed audio data, wherein the processed audio data has been processed by an audio processing device; receiving a set of metadata specifying a value for each of a plurality of settings of the audio processing device, wherein the value defines the state of the corresponding setting of the audio processing device when raw audio data received by the audio processing device was processed to generate the processed audio data; creating an audio file; inserting the processed audio data into the audio file, wherein the inserted audio data is formatted as one or more chunks of audio data; inserting the set of metadata into the audio file, wherein the received metadata is formatted as one or more chunks of settings data; and storing the audio file on computer readable storage connected to the audio workstation.

DETAILED DESCRIPTION

The absence of a provision for storing the settings used to create a particular sound in a manner that associates the settings with that sound often causes frustrations for composers. Composers often forget to make a record of their settings, or if they do make a record, they may not have a straightforward way of associating the settings with its corresponding sound. This can make it difficult and laborious for composers to recreate sounds, and often involves duplicating the work of a previous recording session.

These, and other problems are addressed by adapting the format of an audio file so as to be able to store the sound settings directly within the audio file itself. In this manner, the settings are inextricably tied to the sound created using those settings. When a previously recorded sound is retrieved, the settings are retrieved along with the sound, and are available to the original composer to recreate the identical sound. Furthermore, the sound file may be shared with another composer, who can recreate the sound on another device that has the same audio processing functionality.

Figure 1:
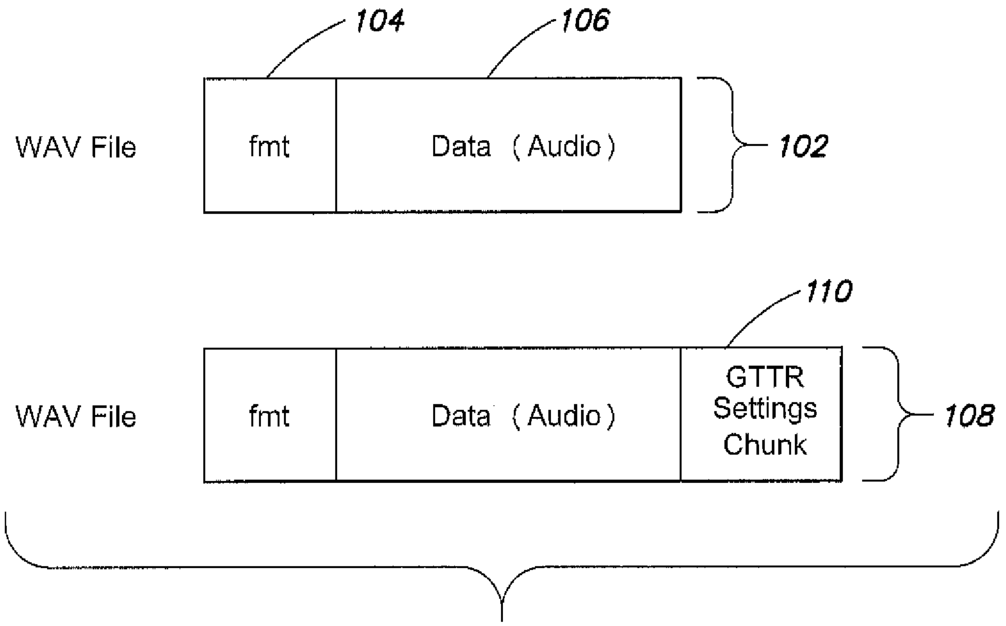
FIG. 1 is schematic diagram of an audio file with embedded audio effects settings.

Audio files, such as those using the WAV or AIFF format, are composed of data chunks. Referring to FIG. 1, each audio file 102 typically starts with file format chunk 104 which includes information such as number of channels, sample rate, bits per sample, and any special compression codes. This is followed by audio chunks 106, that contain the audio essence of the file. In order to store the settings inside an audio file, a new chunk type is created for storing the sound processing settings. Referring again to FIG. 1, audio file 108, in addition to including the standard format and essence chunks, also includes settings chunk 110. The settings chunk is designated by a specific header (indicated at GTRR in the Figure), which enables a system receiving the file to detect the presence of settings metadata, and, perform an appropriate action on that chunk, or alternatively to ignore the chunk.

In the described embodiment, settings chunk 110 is stored in an audio file containing the processed (i.e., "wet") sound. In other embodiments, the settings chunk is incorporated within the unprocessed, "dry" audio. Various workflows enabled by the presence of embedded settings within audio files are described next.

Figure 2:
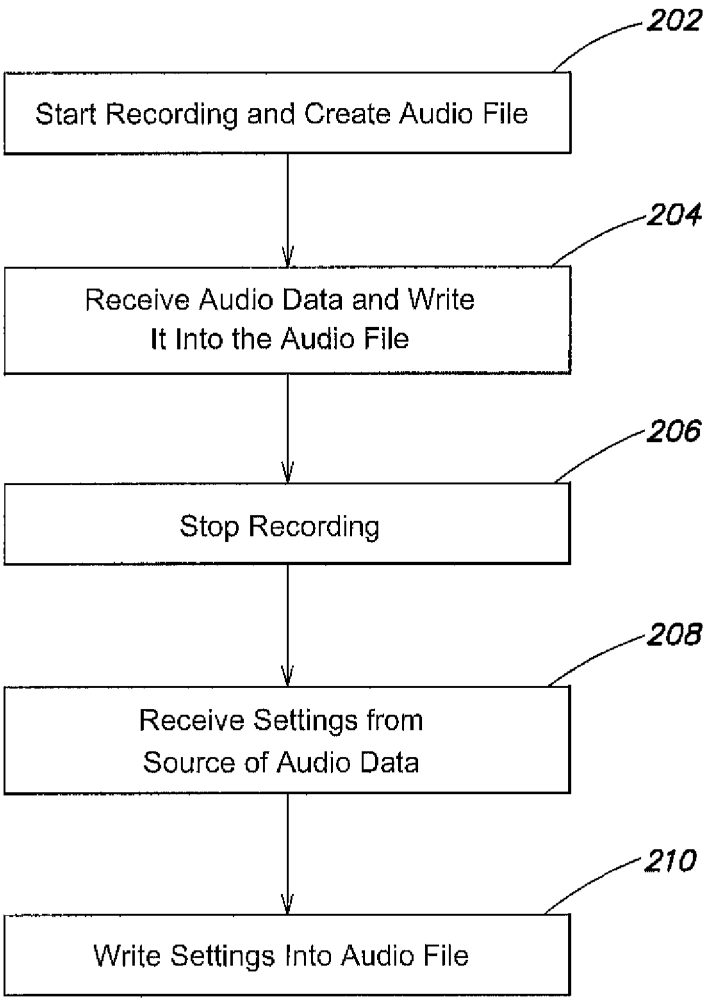
FIG. 2 is a flow chart of a workflow for placing audio effects settings within an audio file.

In a typical recording session, audio is played on various instruments and passed through an effects processor. The output of the effects processor is then transferred to a digital audio workstation (DAW), such as Pro Tools® a product of Avid Technology, Inc. of Burlington Mass., which is connected to the effects processor, for example via a USB connection. Referring to FIG. 2, a composer uses the digital audio workstation to start a recording session and create a new audio file (step 202). The composer adjusts the various settings on the effects processing device to achieve the desired sound, and then performs the music on one or more instruments connected to the effects processing device inputs. The DAW receives the processed sound output from the effects processing device, and writes it into the audio file (step 204). When the composer completes the performance, the DAW recording session is stopped (step 206). At this point, the DAW requests a readout of the effects processor settings that capture the state of the effects processor during the performance. In response to the request, the effects device sends the values of its settings to the DAW, which receives the settings (step 208) and adds settings chunk 110 to the audio file (step 210). Subsequently, the audio file is written to a storage device associated with the DAW. The DAW is typically implemented on a computer system, and the storage device may be the computer's internal disc storage, or a storage server connected to the DAW by a local area or wide area network.

One example of an effects processing devices for which the settings may be stored in an augmented audio file is the guitar processing device named the Eleven® Rack available from Avid Technology, Inc. of Burlington, Mass. This device has a set of user controllable parameters that define the settings, arranged into a set of blocks, each block introducing an effect such an amplifier emulation, distortion, modulation, reverb, wah-wah, and delay. Each of the blocks in turn is controlled by a number of parameters, ranging in number from three to twenty-five. Thus, up to approximately 150 different values may be required to specify a particular state of the effects processor. In addition, the settings may include the state of input devices connected to the effects processor, such as a foot pedal or foot switch. The various parameters may be adjusted by the composer via rotary knobs, sliders, and/or virtual controls mediated via touch-sensitive displays. The current state of the device is indicated via one or more display screens and indicator lights.

The effects processing device is implemented using one or more dedicated signal processors (DSPs) for handling the audio effects, and a general purpose processor for providing the user interface, and handling the communication between the effects processor and the DAW. In addition, the processor may perform other functions, such as processing MIDI commands.

Examples of other audio effects processing devices for which the settings may be stored in an augmented audio file include, but are not limited to: samplers, including drum machines, for which the settings include specifications of the samples loaded, together with the effects and filters that were used; and synthesizers for which the settings include oscillator settings and the selected effects and filters. For some devices, the settings that are stored may include MIDI controller values, such as continuous controller values for volume level or for pan position, and MIDI System Exclusive messages for transmitting other information about the applied settings.

Figure 3:
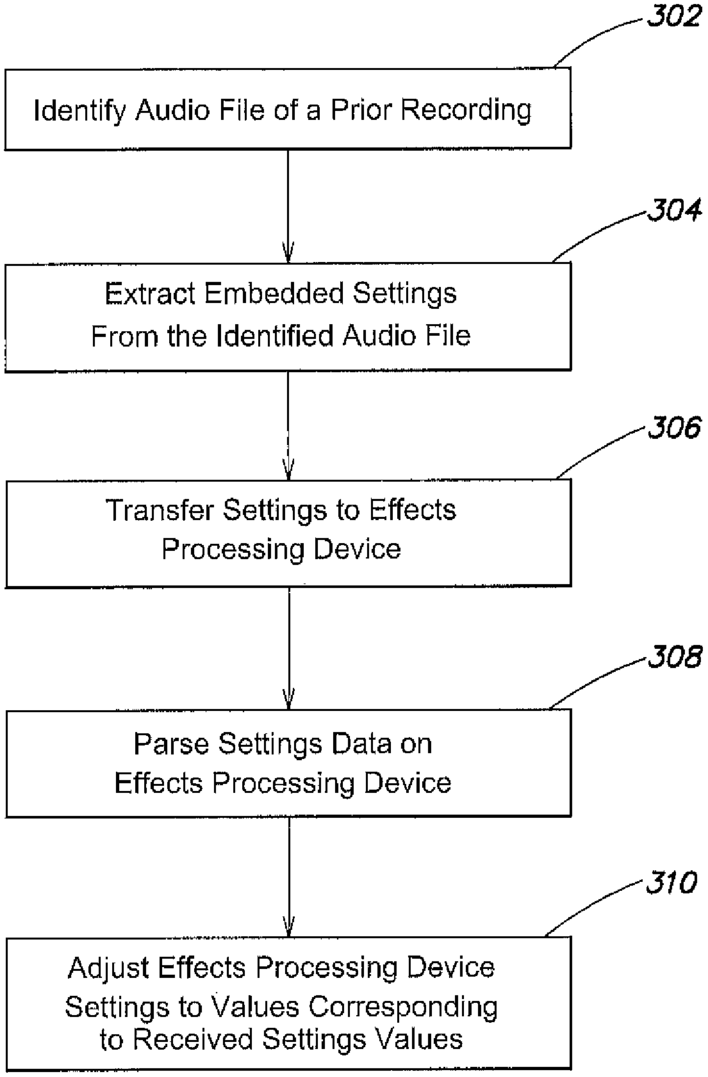
FIG. 3 is a flow chart of a workflow for retrieving and applying audio effects processing settings from an existing audio file.

We now describe exemplary uses of the audio files described above with reference to FIG. 3. In the first example, a composer discovers a mistake in a recording. To correct the mistake, the author uses the DAW to identify the audio file with the mistake (step 302), and requests that the metadata in the embedded settings chunk be extracted from the audio file (step 304) and transferred to the effects processor (step 306). The effects processor parses the metadata (step 308), and adjusts its settings to correspond to the received values (step 310). With the effects processor now restored to the state corresponding to the state when the original recording was made, the composer may now replace the mistake using the identical sound to that originally used so that the redub is seamless. In addition to correcting errors, the composer may add to or create a variation on the original recording.

In a second example, the composer wishes to adjust the sound to one that is related to a prior sound. By retrieving the settings of the prior sound, the composer builds from the prior sound, to achieve a modified sound. For example, one or more effects may have been bypassed when generating the prior sound. To create a variant sound, the composer may choose to retain the settings of the effects that were previously used, and add in new effects.

A third example involves the sharing of sounds. An audio file may be retrieved by another composer, so as to record a part for the same composition, or to use the same sound in a different composition. Such workflows require that each composer who uses the audio settings in an audio file needs to be using an effects processing device that is able to parse the settings metadata, and adjust its settings accordingly. In the simplest case, this condition is met when each composer is using the same effects processing device. In other cases, different effects processing devices may be used that share at least some settings parameters, and are able to parse the format used to encode the settings values.

To facilitate sharing, audio files including effects settings may be posted in audio file libraries; users may preview a range of sounds (e.g., by downloading or streaming the audio and playing it on a media player), select one or more of the previewed sounds, and then retrieve the settings corresponding to the selected sounds, with or without the corresponding audio data.

In the workflows described above, a single state of the effects processing device is captured for each audio file. In the described embodiment, the captured settings correspond to the state of the processing device at the end of the recording session. In other embodiments, the settings are captured at the beginning of the file, or at a user-specified point within the recording. In some embodiments, settings are changed within a particular recording, and a settings chunk is stored for each state of the effects processing device, with the chunk including start and stop time stamps that identify the spans within the audio file corresponding to each of the settings chunks.

The various components of the system described herein, including the DAW and the effects processing device, may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, cathode ray tubes, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic or optical discs, which may include an array of local or network attached discs.

A system such as described herein may be implemented in software or hardware or firmware, or a combination of the three. The various elements of the system, either individually or in combination may be implemented as one or more computer program products in which computer program instructions are stored on a computer readable medium for execution by a computer, or transferred to a computer system via a connected local area or wide are network. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of processing audio data, the method comprising:

inputting an audio file comprising settings information for a first audio processing device and processed audio data, wherein the settings information includes a captured value for each setting of a plurality of settings of the first audio processing device when the first audio processing device generated the processed audio data from first audio input that was received by the first audio processing device;

extracting the settings information from the audio file;

sending the settings information to a second audio processing device; and wherein, after receiving the settings information, the second audio processing device:

for each setting of the plurality of settings of the first audio device, adjusts a value of a corresponding setting of a plurality of settings of the second audio device to the captured value of the corresponding setting of the first audio device, thereby placing the second audio processing device in a copied state;

receives second audio input; and while in the copied state, processes the second audio input to generate processed audio.

2. The method of claim 1, wherein the audio processing device processes audio input to produce audio effects.

3. The method of claim 1, wherein the plurality of settings of the first audio device include at least one of a distortion effect setting and a reverb effect setting.

4. The method of claim 1, wherein the audio file is stored in one of a waveform audio file format and an AIFF format, and wherein the audio data is stored in one or more audio data chunks and the metadata is stored in a settings chunk.

5. The method of claim 1, wherein the first audio input was received by the first audio processing device from a musical instrument.

6. The method of claim 5, wherein the musical instrument was an electric guitar.

7. The method of claim 1, wherein the processed audio data includes audio effects introduced by the first audio processing device.

8. The method of claim 7, wherein the audio effects include at least one of a distortion effect, a reverb effect, and a delay effect.

9. The method of claim 5, wherein the musical instrument is one of the set consisting of a guitar, a synthesizer, and a sampler.

10. The method of claim 1, further comprising enabling a user to adjusts the second audio processing device from the copied state to a new state by adjusting a value of at least one of the plurality of settings of the second audio processing device.

11. The method of claim 1, further comprising enabling a user to adjusts the second audio processing device from the copied state to a new state by adjusting a value of at least one setting of the second audio processing device that is not one of the plurality of settings of the second audio processing device.

12. The method of claim 1, wherein the first audio device is of the same type as the second audio device.

13. A method of generating processed audio, the method comprising:

receiving at a first digital audio workstation processed audio from a first audio processing device;

receiving at the first digital audio workstation settings information defining a captured state of the first audio processing device when the first audio processing device generated the processed audio from first audio input that was received by the first audio processing device;

creating an audio file, wherein the audio file comprises the processed audio and the settings information;

sending the audio file to a second digital audio workstation, wherein the second digital audio workstation, after receiving the file:

extracts the settings information from the audio file;

sends the settings information to a second audio processing device; and wherein the second audio processing device after receiving the settings information:

adjusts its settings to place itself into a copied state that corresponds to the captured state of the first audio processing device;

receives second audio input; and while in the copied state, processes the second audio input to generate processed audio.

14. A computer system for generating processed audio, the computer system comprising:

a processor;

a memory storing computer program instructions that, when processed by the processor configure the computer system to:

input an audio file comprising processed audio data and settings information, the settings information defining a captured state of a first audio processing device when the first audio processing device generated the processed audio data from first audio input that was received by the first audio processing device;

extract the settings information from the audio file;

send the settings information to a second audio processing device;

wherein second audio processing device, after receiving the settings information:

adjusts its settings to place itself into a copied state that corresponds to the captured state of the first audio processing device;

receives second audio input; and while in the copied state, processes the second audio input to generate processed audio.

15. A computer program product comprising:

a non-transitory computer-readable medium;

computer program instructions stored on the non-transitory computer-readable medium that, when processed by a computer, instruct the computer to perform a method for generating processed audio, the method comprising causing the computer to:

input an audio file comprising settings information for a first audio processing device and processed audio data, wherein the settings information includes a captured value for each setting of a plurality of settings of the first audio processing device when the first audio processing device generated the processed audio data from first audio input that was received by the first audio processing device;

extract the settings information from the audio file;

send the settings information to a second audio processing device; and wherein, after receiving the settings information the second audio processing device:

for each setting of the plurality of settings of the first audio device, adjusts a value of a corresponding setting of a plurality of settings of the second audio device to the captured value of the corresponding setting of the first audio device, thereby placing the second audio processing device in a copied state;

receives second audio input; and while in the copied state, processes the second audio input to generate processed audio.

* * * * *